(12) United States Patent
Garrison (10) Patent No.: US 11,897,070 B1
(45) Date of Patent: Feb. 13, 2024

(54) MACHINING TABLE

(71) Applicant: Richard Garrison, Ephrata, PA (US)

(72) Inventor: Richard Garrison, Ephrata, PA (US)

( * ) Notice: Subject to any disclaimer, the term of this patent is extended or adjusted under 35 U.S.C. 154(b) by 311 days.

(21) Appl. No.: 17/076,770

(22) Filed: Oct. 21, 2020

(51) Int. Cl.
  *B23Q 3/06* (2006.01)
  *B23Q 3/10* (2006.01)

(52) U.S. Cl.
  CPC ............. *B23Q 3/064* (2013.01); *B23Q 3/069* (2013.01); *B23Q 3/107* (2013.01)

(58) Field of Classification Search
  CPC . B23Q 3/02; B23Q 3/06; B23Q 3/064; B23Q 3/066; B23Q 3/102; B23Q 3/103; B25B 1/20; B25B 5/147; B25H 1/08; B25H 1/10
  See application file for complete search history.

(56) References Cited

U.S. PATENT DOCUMENTS

| | | | |
|---|---|---|---|
| 21,951 A * | 11/1858 | Ford | B25B 5/101 |
| | | | 269/221 |
| 1,694,474 A * | 12/1928 | Lainer | B25B 5/08 |
| | | | 269/283 |
| 2,422,531 A | 7/1943 | Dannehower | |
| 2,455,391 A | 12/1948 | Sutton | |
| 2,460,890 A | 2/1949 | Lassy | |
| 3,051,473 A * | 8/1962 | Juhase | B25B 1/10 |
| | | | 269/95 |
| 4,445,678 A * | 5/1984 | George | B23Q 3/104 |
| | | | 269/282 |
| 6,444,941 B1 | 9/2002 | Russo | |
| 9,636,801 B1 * | 5/2017 | Lee | B25B 1/02 |
| 9,789,575 B2 | 10/2017 | Scarbrough | |
| 2015/0000109 A1 * | 1/2015 | Plank | B23Q 1/037 |
| | | | 269/299 |

* cited by examiner

Primary Examiner — Tyrone V Hall, Jr.
(74) Attorney, Agent, or Firm — Muskin and Farmer LLC (57) ABSTRACT

A method and apparatus to provide a machining table in which an article can be secured to the table. The table provides a plurality of clamp blocks which can be placed on the table in custom positions. The orientation of the clamp blocks can also be adjusted by adjustments bolts so that the desired angle of the article can be maintained before machining it. As such, a round article (e.g., a pipe) can be secured through the clamp blocks so that the article can be machined. The table would secure the article such that even a lot of force or pressure on the article would not cause the article to move.

20 Claims, 6 Drawing Sheets

MACHINING TABLE

BACKGROUND OF THE INVENTION

Field of the Invention

The present general inventive concept is directed to a machine table apparatus, and a method for its use.

Description of the Related Art

Currently, when a pipe or other round article is desired to be machined (e.g., cut, etc.) it can be stabilized by the use of a "v-block." A v-block is a tool which receives an article in a "v"-shaped depression so that the article can be machined. However, a disadvantage of using a v-block is that the article can easily slip out of the v-block (or roll, etc.) In addition, a v-block has another disadvantage in that it cannot easily and accurately be leveled.

Therefore, what is needed is a more secure way to stabilize an elongated round article so it can be machined.

SUMMARY OF THE INVENTION

It is an aspect of the present invention to provide an improved apparatus and method to stabilize a round article.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Reference will now be made in detail to the presently preferred embodiments of the invention, examples of which are illustrated in the accompanying drawings, wherein like reference numerals refer to like elements throughout.

The present inventive concept is directed to a stabilization table (or "table") used to sure an article (typically round although not required to be). The table can be in various sizes (e.g., from SHERLINE PRODUCTS) which can be 7 inches by 13 inches, or any other sizes. The article can be elongated, such as a round pipe or similar round structure. A user would desire to cut the article. However, before the article can be cut, it should be secured (so it cannot turn, roll, move, etc.) and properly orientated (e.g., the angle it is lies should be adjustable so it can be parallel to the table (or floor), although it can also be adjusted to point up or down as desired by the user).

Once the article is secured and adjusted accordingly inside the table, it can then be cut and then removed from the table.

Figure 1:
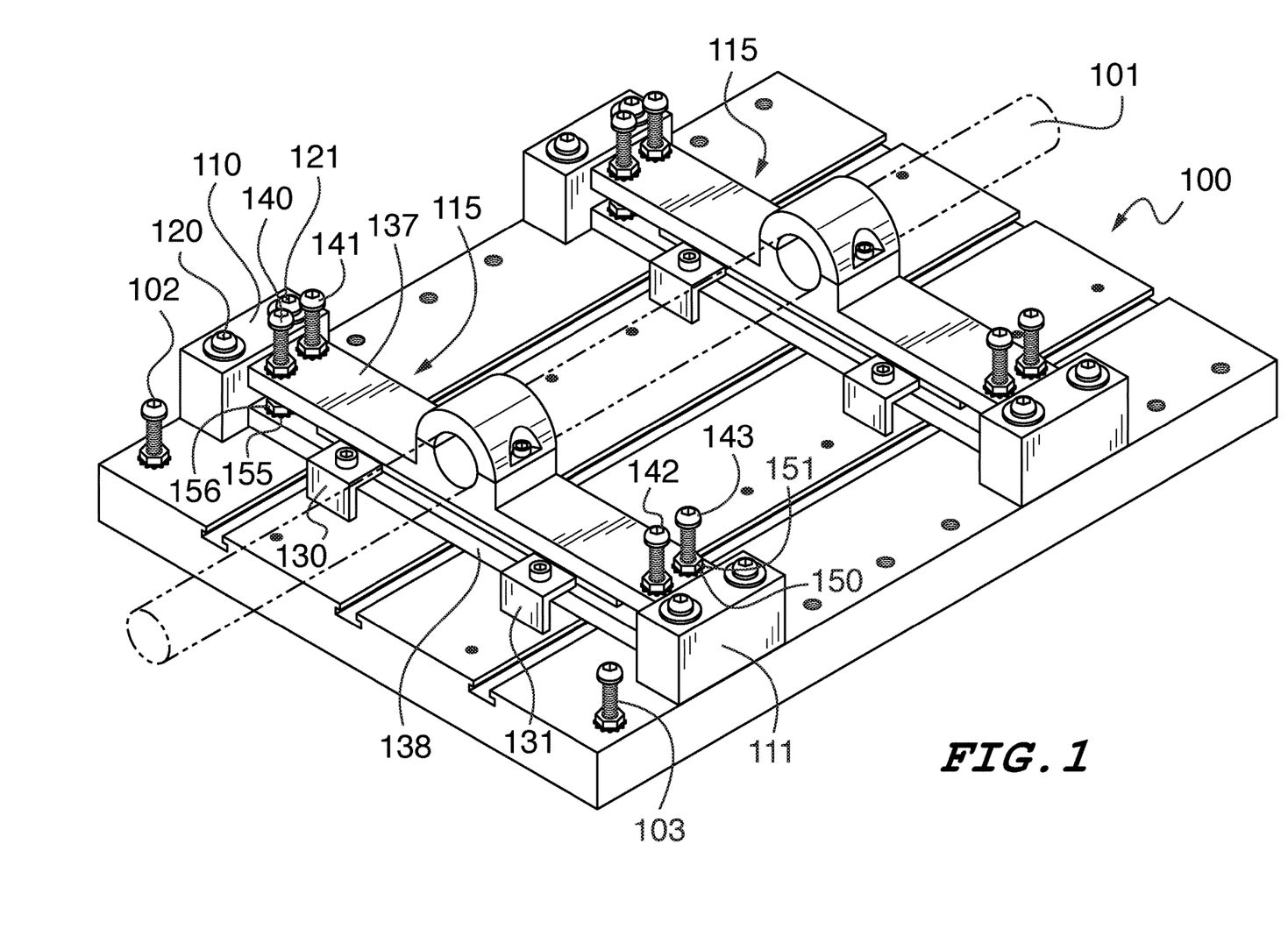
FIG. 1 is a drawing of a stabilization table, according to an embodiment.

FIG. 1 is a drawing of a stabilization table, according to an embodiment.

An article 101 is to be machined (e.g., cut) after it is stabilized on the stabilization table 100 (also referred to as "table"). The table 100 (and any parts described herein) can be made of any solid material such as metal (e.g., steel, aluminum, etc.), wood, or any other suitable material. The table 100 has numerous threaded screw holes throughout which can receive a screw or bolt.

Securing bolts 102, 103 are screwed through the table 100 into a surface underneath the table 100, thereby securing the table 100 to another table or surface. Note that securing bolts (or screws) 102, 103 (and any other such bolts not shown) can be used to level the table 100. In other words, the securing bolts (102, 103, and others not pictured) can be located at all four corners of the table and can be used to selectively adjust (by turning the respective securing bolt) the height of each corner, until the table is completely level. While two such securing bolts 102, 103 are shown, it can be appreciated that additional securing bolts can be used, including two more at the opposite end of the table 100.

A first end stop 110 and a second end stop 111 are used to secure a clamp block 115 onto the table 100. End stop bolts 120, 121 are screwed through the first end stop 110. Note that all of the end stops 110, 111 (and all others) have two bolt holes therein to receive a bolt (or screw). The respective end stop bolts 120, 121 pass through the end stop 110 and through threaded holes in the table 100 (not visible in FIG. 1). Note that all end stops have this same structure. In this manner, the first end stop 110 and the second end stop 111 press against the clamp block 115 and contain the clamp block 115 so the clamp block 115 rests between the first end stop 110 and the second end stop 111. Note that the end bock bolts 120, 121 also pass through a respective washer on top of the respective end stop. The end stops can be 1.75 inch by 1.75 inch length. Note that the holes in the table 100 that the end stops 110, 110 (and all other end stops) screw into can be evenly spaces throughout the table therefore allowing adjustment of the location of the end stops by selective placing the end stops in a desired location (over the selected holes) and then screwing the end stops into the table 100.

The clamp block 115 has an upper level 137 and a lower level 138. Brackets 130, 131 are used to secure the lower level 138 of the clamp block 115 to the table 100. A respective bracket bolt 135, 136 passes through its respective bracket 130, 131 and through a respective threaded hole in the table 100, thereby securing the lower level 138 of the clamp block 115 to the table 100. There are two brackets on each side of the clamp block 115 (brackets 130, 131 are visible in FIG. 1 although two additional such brackets on the other side of the clamp block 115 are not visible in FIG. 1). Note that all brackets used herein have the same structure and function (including its own respective bracket bolt). The clamp blocks can be 1.75 inches by 5.5 inches.

Each clamp block 115 has two pairs of adjustment bolts 140, 141, 142, 143, one pair on each side of the clamp block 115. The adjustment bolts are used to adjust a distance between the lower level 138 of the clamp block 115 and the upper level 137 of the clamp block 115, thereby raising and lowering the upper level 137 depending on which direction the adjustment bolt is turned. A bolt is turned counterclockwise to lower the upper level 137 and clockwise to raise the upper level 137. There are four such adjustment bolts 140, 141, 142, 143 on the clamp block 115. The bolts can be any size, for example, 10-32×⅕ inches hex-head or any other size.

While the brackets 130, 131 (and others) attach the lower level 138 to the table 100, the adjustment bolts 140, 141, 142, 143 attach the upper level 137 to the lower level 138. Each adjustment bolt 140, 141, 142, 143 has its own respective two nuts and two washers (a first washer 150 contacting the upper level 137 and a first nut 151 contacting the first washer 150), and a second washer 155 contacting the lower level 138 and a second nut 156 contacting the second washer 155). As the adjustment bolts are turned, the adjustment bolt's washer(s) and nut(s) may also have to be adjusted (e.g., tightened) to ensure a secure (stationary) contact of the upper level 137 and the lower level 138. Brackets 130, 131 can be clamps from SHERLINE (or any other manufacturer). Note that washers 150 (and any other washer herein) can be external tooth lock washers #10 (or any other type of washer). Washers can also be (for example flat washers #10). Note that any nut herein can be size 10-32. Note that any hex head screw/bolt herein (e.g., 136) can be size 10-32×0.75 inch hex head.

Note that a plurality of clamp blocks (e.g., clamp block 115 and all supporting parts) can be used throughout the table 100 and each such clamp block would have the same structure as shown and described herein.

In this manner, a plurality of clamp blocks are attached to the table 100 and aligned such that an elongated article 101 can pass through the plurality of clamp blocks and hence the article 101 would be stabilized and cannot move in any direction.

Figure 2:
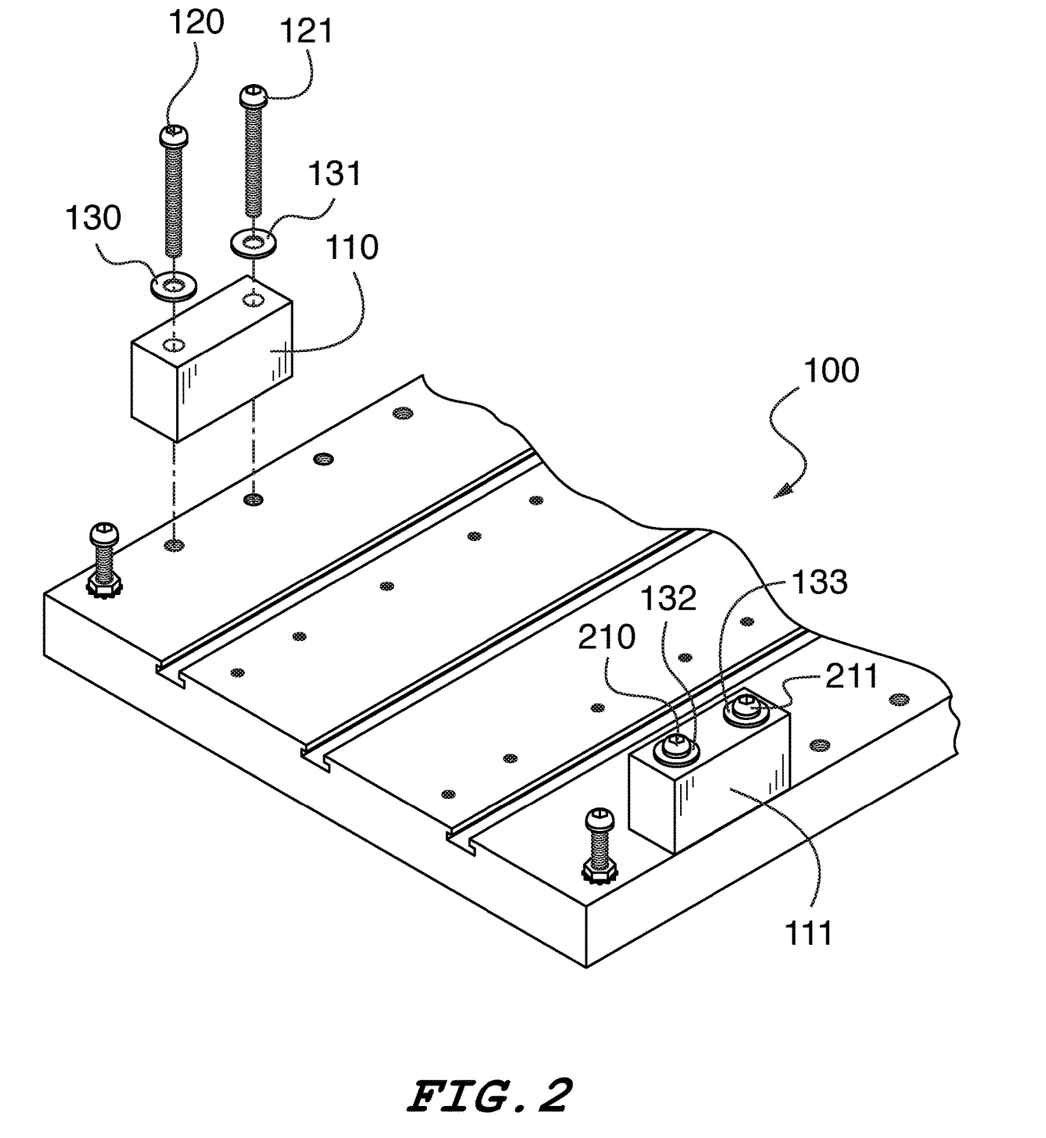
FIG. 2 is a drawing of a stabilization table showing end stops being secured, according to an embodiment.

FIG. 2 is a drawing of a stabilization table showing end stops being secured, according to an embodiment.

The first end stop 110 has two respective end stop bolts 120, 121, and the second end stop 111 has two respective end stop bolts 210, 211. End stop washers 130, 131 and 132, 133 sit between each respective end stop bolt 120, 121, 210, 22 and the respective end stop 110, 111, as shown. FIG. 2 shows the first end stop 110 being connected to the table 100 via the end stop bolts 120, 121 and end stop washers 130, 131. The second end stop 111 is shown already attached to the table 100.

Note that the table 100 has a plurality of holes along the length of the table 100 to which the end stops 110, 111 can be screwed into. The user of the table 100 can choose the location of the end stops 110, 111 by screwing them into the selected holes in the table 100. Note that both corresponding end stops 110, 111 should be facing each other (the same offset from the end of the table 100). Note that each (and any) hole that a bolt passes through can be internally threaded to accommodate the respective bolt.

Figure 3:
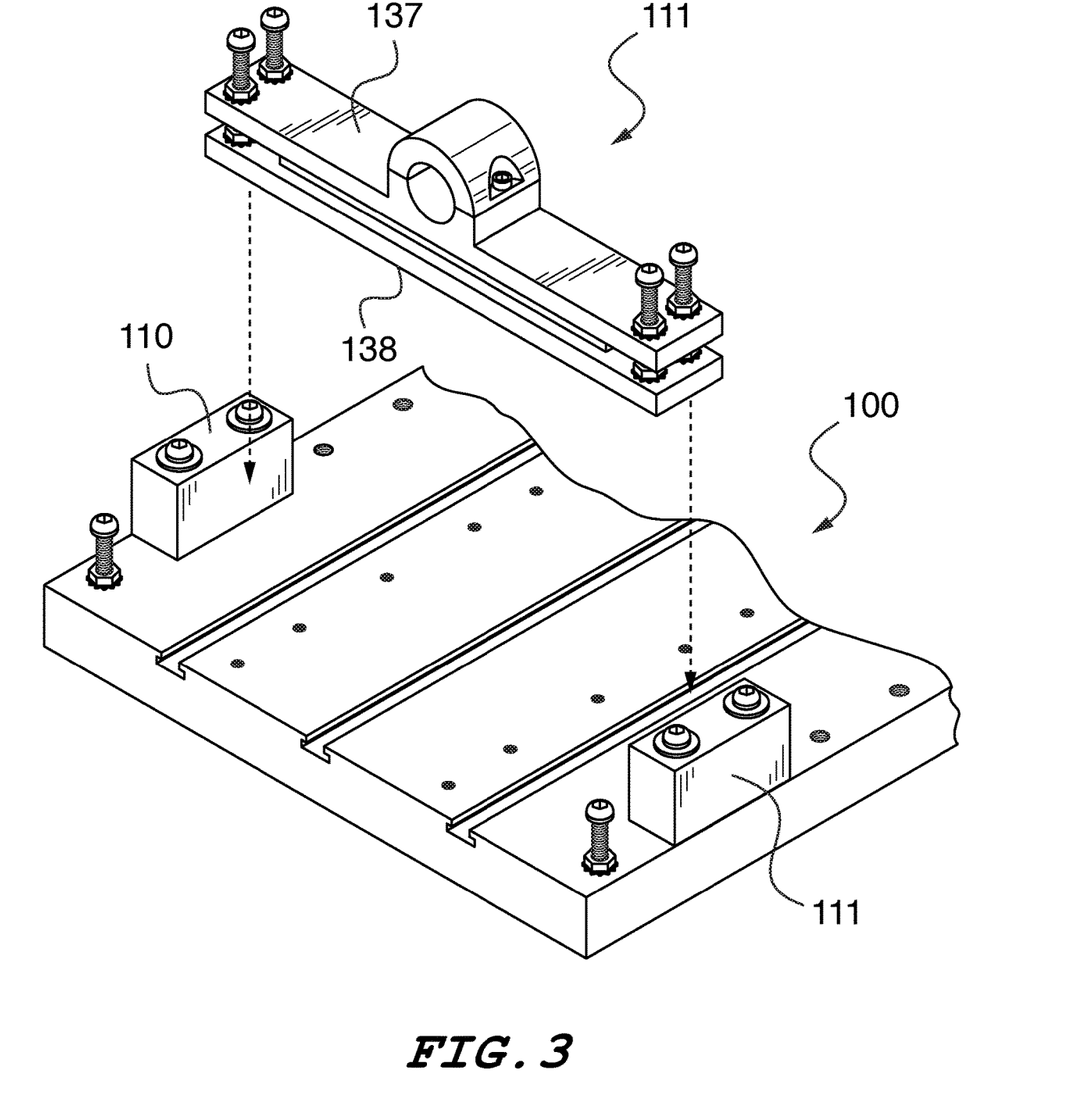
FIG. 3 is a drawing showing a clamp block being attached to the stabilization table, according to an embodiment.

FIG. 3 is a drawing showing a clamp block being attached to the stabilization table, according to an embodiment.

The clamp block 115 is comprises of the upper level 137 and the lower level 138 and is fitted between the first end stop 110 and the second end stop 111. While the fit should be snug which can retain the clamp block 115 into place, the clamp block 115 should still be secured with brackets as shown in FIG. 1 and FIG. 4.

Typically, the table 100 would be configured with one or more additional clamp block(s) which are identical to the clamp block 115. The more such clamp blocks used will help stabilize the article.

Figure 4:
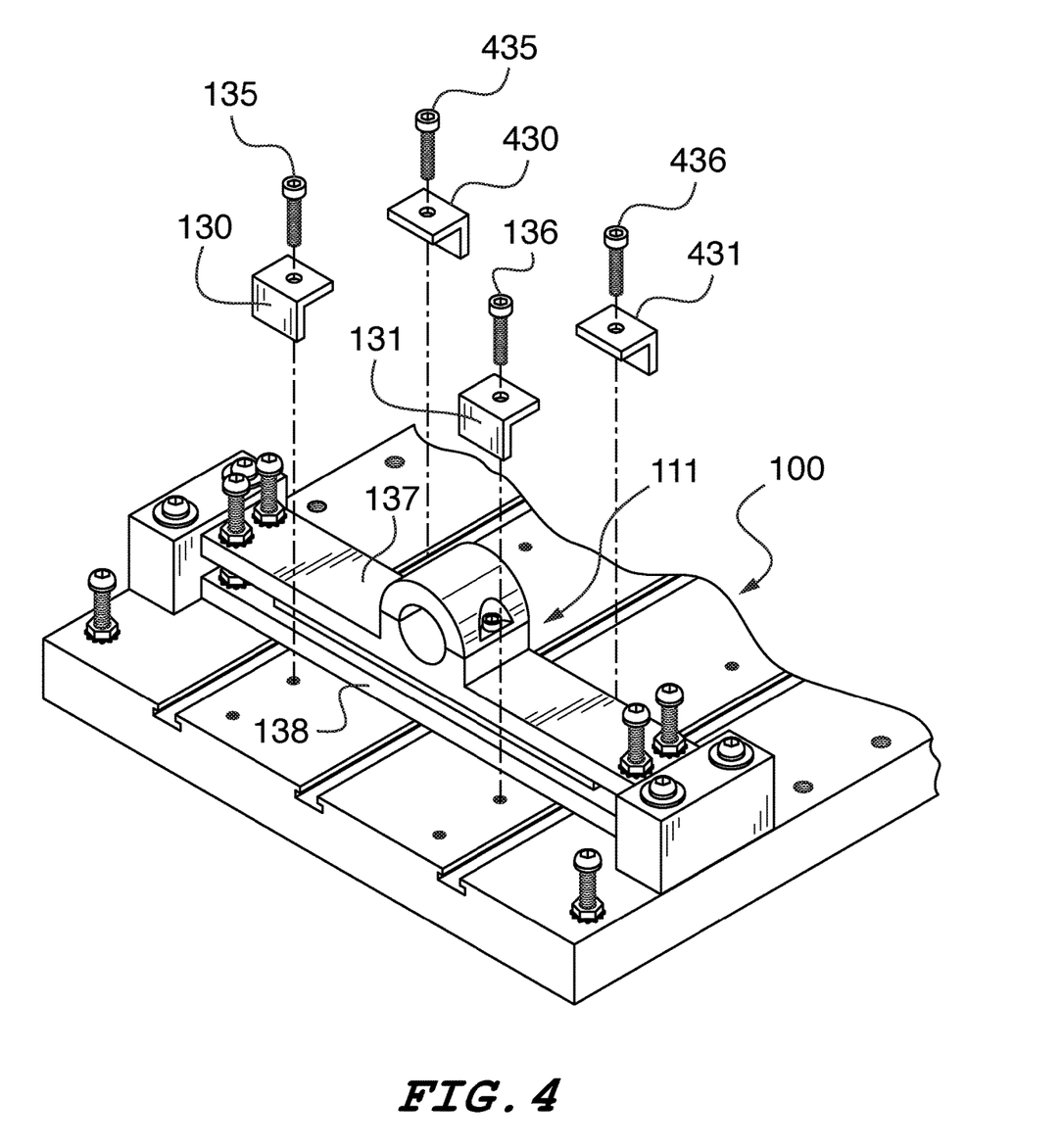
FIG. 4 is a drawing showing securing brackets attaching the clamp block to the stabilization table, according to an embodiment.

FIG. 4 is a drawing showing securing brackets attaching the clamp block to the stabilization table, according to an embodiment.

Brackets 130, 131 are shown being attached to the table 100 via respective bracket bolts 135, 136. Additional brackets 430, 431 are shown being attached to the table via their respective bracket bolts 435, 436. All four brackets 130, 131, 430, 431, when attached to the table 100, serve to secure the lower level 138 of the clamp block 115 (and hence the upper level 137) to the table 100.

Figure 5:
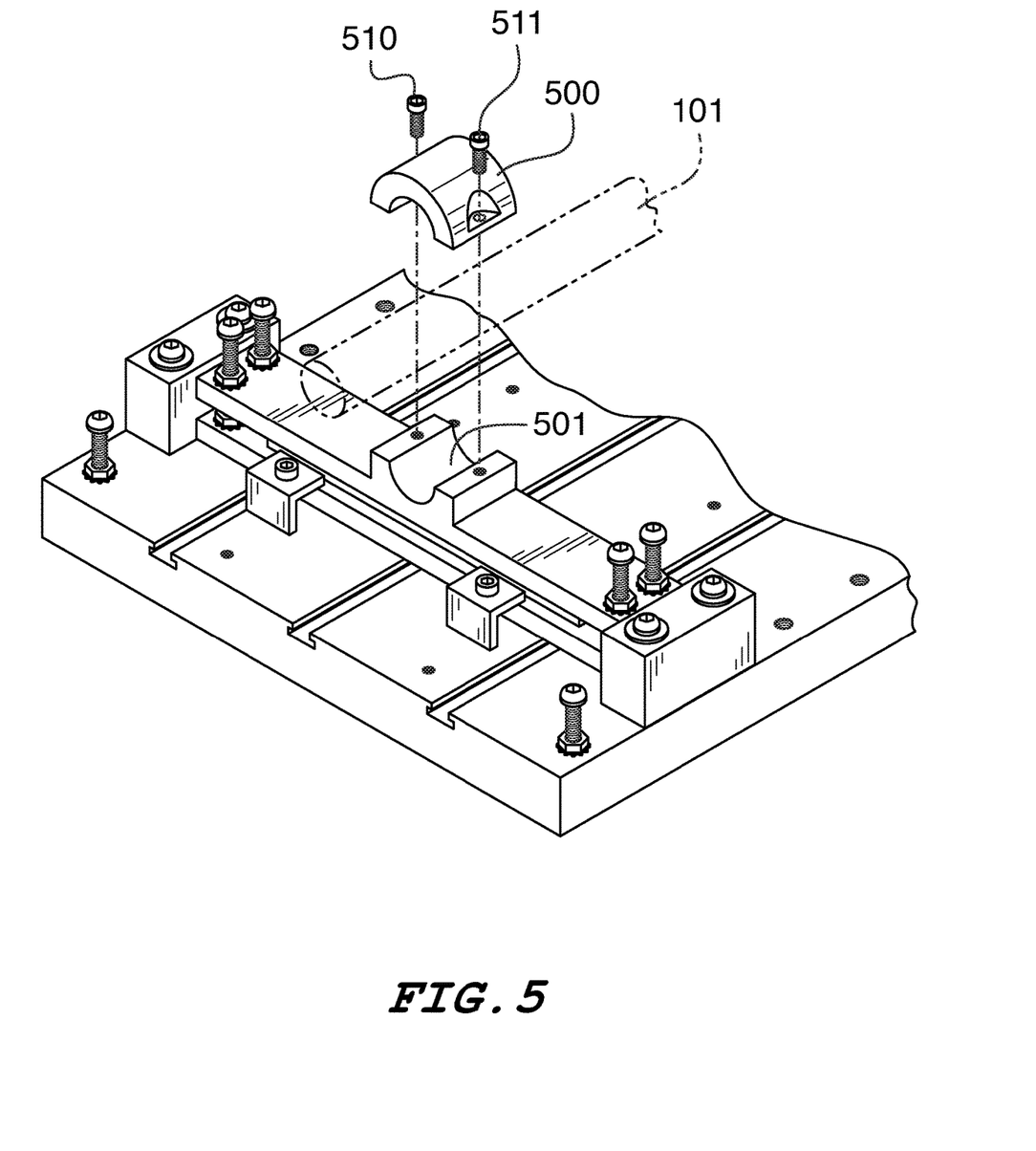
FIG. 5 is a drawing showing securing an article inside the clamp, according to an embodiment.

FIG. 5 is a drawing showing securing an article inside the clamp, according to an embodiment.

The clamp block 115 comprises an upper clamp 500 which attaches to a lower clamp 501 (which is an integral part of the clamp block 115). The upper clamp 500 screws (or bolts) onto the lower clamp 501 via two clamp screws 510, 511. Note that in an alternate embodiment, instead of using the clamp screws 510, 511 to attach the upper clamp 500 to the lower clamp 501, an adhesive (e.g., glue (such as epoxy, or any other type of glue) can be used to hold the upper clamp 500 to the lower clamp 501. Note that typically, the article 101 is placed onto the lower clamp 501 before the upper clamp 500 is attached onto the lower clamp 501 so that the article 101 would be held tight by the force of the upper clamp 500 and the lower clamp 501. For the multiple clamp blocks that are used, typically the article 101 would be placed over the lower clamp before all of the respective upper clamps are then attached to their lower clamps. In this way, the article 101 would be secure tightly by all of the clamp blocks.

Figure 6:
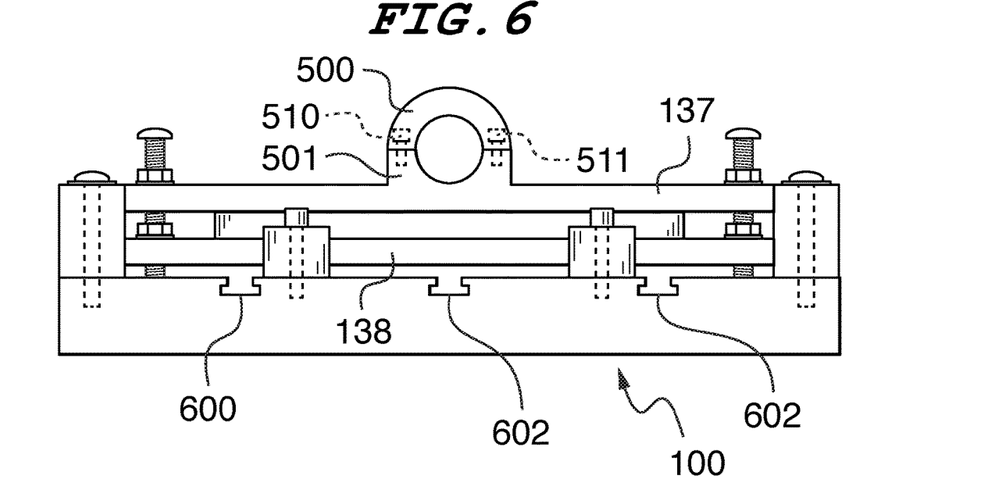
FIG. 6 is a drawing showing an end view of the stabilization table, according to an embodiment.

FIG. 6 is a drawing showing an end view of the stabilization table, according to an embodiment.

Note that the three tracks (or grooves) 600, 601, 602 in the base of the table 100 are tracks for standard tooling and can hold material for machining, but they aren't used in the inventive concept to stabilize an article.

Figure 7:
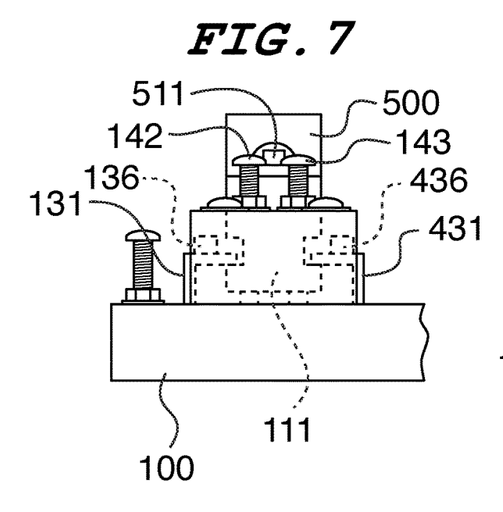
FIG. 7 is a drawing showing a side view of the stabilization table, according to an embodiment.

FIG. 7 is a drawing showing a side view of the stabilization table, according to an embodiment.

The two adjustment bolts 142, 143 are shown which are used to adjust the height and orientation of the clamp block 115. If both adjustment bolts 142, 143 are turned clockwise they would raise the clamp block 115 relative to the table 100. If both adjustment bolts 142, 143 are turned counterclockwise then they would lower the clap block 111 relative to the table 100. Starting with both adjustment bolts 142, 143 at the same height (level), if just adjustment bolt 142 was turned clockwise (but not turning adjustment bolt 143) then the clamp block 115 would orient itself in a negative slope (from the viewpoint shown in FIG. 7). Starting with both adjustment bolts 142, 143 at the same height (level), if just adjustment bolt 143 was turned clockwise (but not turning adjust bolt 142) then the clamp block 115 would orient itself in a positive slope (from the viewpoint shown in FIG. 7). Each pair of adjustment bolts (two adjustment bolts that are adjacent to each other in the same clamp block) operate similarly.

Starting with both adjustment bolts 142, 143 at the same height (level), if just adjustment bolt 142 was turned counter-clockwise (but not turning adjustment bolt 143) then the clamp block 115 would orient itself in a positive slope (from the viewpoint shown in FIG. 7). Starting with both adjustment bolts 142, 143 at the same height (level), if just adjustment bolt 143 was turned counter-clockwise (but not turning adjust bolt 142) then the clamp block 11 would orient itself in a negative slope (from the viewpoint shown in FIG. 7).

Figure 8:
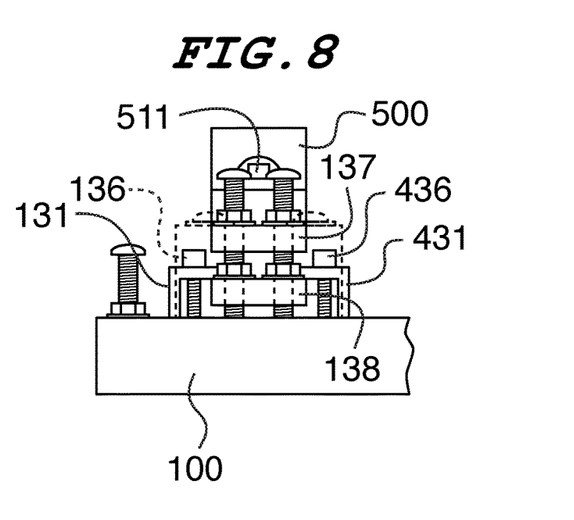
FIG. 8 is a drawing showing a side view of the stabilizing table with an end stop removed, according to an embodiment.

FIG. 8 is a drawing showing a side view of the stabilizing table with an end stop removed, according to an embodiment.

Note that all parts shown herein can be made of standard machine parts, such as steel, aluminum, etc. All holes that bolts pass through herein can be threaded. Note that any parts not visible in the drawings would have the same structure as their counterparts that are visible. In addition, duplicate parts would have the same structure as their original part. For example, the clamp block 115 is shown and described is identical to the second clamp block shown in FIG. 1. In addition, any number of clamp blocks can be used and they would all have the same structure and function as clamp block 115 (and all of its parts). In addition, all parts herein can be made using any size and the sizes and ratios of parts are not limited to the ones shown herein. In addition bolts and screws can be used interchangeably unless such substitution would render the part inoperable for its purpose.

In the manner shown and described herein, a plurality of clamp blocks can be custom positioned on a table and then used to secure an article. Once the article is secured inside the upper clamp and lower clamp of each clamp block, then the article can be machined (e.g., cut, sanded, etc.) Once the machining of the article is completed, the upper clamp can then be loosened (removed) from the lower clamp to remove the article. The apparatus described herein also allows adjusting of the orientations of each of the clamp blocks in order to allow the user to customize the configuration in order to provide the ideal positions and angles to secure and machine the article. Note that all directions such as clockwise and counterclockwise can also be reversed herein.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:
a table;
a first clamp block attached to the table;
a first end stop attached to the table and abutting a first end of the first clamp block;
a second end stop attached to the table and abutting a second end of the first clamp block, the second end opposite the first end;
the first clamp block comprising an upper level and a lower level;
a clamp attached to the upper level of the first clamp block;
a first pair of adjustment bolts on a first end portion of the first clamp block near the first end stop passing through both the upper level and the lower level, the first pair of adjustment bolts configured to adjust an angle of the upper level;
a second pair of adjustment bolts on a second end portion of the first clamp block near the second end stop passing through both the upper level and the lower level, the second pair of adjustment bolts configured to adjust an angle of the upper level;
a second clamp block attached to the table;
a third end stop attached to the table and abutting a third end of the second clamp block;
a fourth end stop attached to the table and abutting a fourth end of the second clamp block, the fourth end opposite the third end;
the second clamp block comprising a second upper level and a second lower level;
a second clamp attached to the second upper level of the second clamp block;
a third pair of adjustment bolts on a first end portion of the second clamp block near the third end stop passing through both the second upper level and the second lower level, the third pair of adjustment bolts configured to adjust an angle of the second upper level; and
a fourth pair of adjustment bolts on a second end portion of the second clamp block near the fourth end stop passing through both the second upper level and the second lower level, the fourth pair of adjustment bolts configured to adjust an angle of the second upper level.

2. The apparatus as recited in claim 1, wherein the table comprises a plurality of holes aligned with the first end stop, thereby allowing adjustment of a location of the first end stop.

3. The apparatus as recited in claim 1, wherein the first end stop and the third end stop are aligned.

4. The apparatus as recited in claim 1, wherein the clamp comprises an upper clamp and a lower clamp which are attachable by at least one screw.

5. The apparatus as recited in claim 1, wherein the clamp is circular shaped.

6. The apparatus as recited in claim 1, wherein the lower level is attached to the table using a plurality of brackets.

7. The apparatus as recited in claim 6, wherein the table has a plurality of bracket holes used for respective bolts or screws which secure the plurality of brackets to the table.

8. The apparatus as recited in claim 1, further comprising an article placed inside the clamp and the second clamp.

9. The apparatus as recited in claim 8, wherein the article has an elongated cylinder shape.

10. The apparatus as recited in claim 8, wherein the article is tightly secured inside the clamp and the second clamp.

11. The apparatus as recited in claim 1, wherein the first clamp block is configured such that if both adjustment bolts in the first pair of adjustment bolts are turned clockwise they would raise their side of the first clamp block relative to the table.

12. The apparatus as recited in claim 1, wherein the first clamp block is configured such that if both adjustment bolts in the first pair of adjustment bolts are turned counter-clockwise they would lower their side the first clamp block relative to the table.

13. The apparatus as recited in claim 1, wherein the first clamp block is configured such that if one adjustment bolt out of the first pair of adjustment bolts is turned clockwise then the first clamp block would adjust an angle relative to the table.

14. The apparatus as recited in claim 1, wherein the first clamp block is configured such that if both adjustment bolts in the second pair of adjustment bolts are turned clockwise they would raise their side of the first clamp block relative to the table.

15. The apparatus as recited in claim 14, wherein the first clamp block is configured such that if both adjustment bolts in the second pair of adjustment bolts are turned counter-clockwise they would lower their side of the first clamp block relative to the table.

16. The apparatus as recited in claim 15, wherein the first clamp block is configured such that if one adjustment bolt out of the second pair of adjustment bolts is turned clockwise then the first clamp block adjust change an angle relative to the table.

17. The apparatus as recited in claim 1, wherein the first clamp block is configured such that if both adjustment bolts in the first pair of adjustment bolts are turned clockwise and both adjustment bolts in the second pair of adjustment bolts are turned clockwise then the first clamp block would raise relative to the table parallel to the table.

18. The apparatus as recited in claim 1, wherein the first clamp block is configured such that if both adjustment bolts in the first pair of adjustment bolts are turned counter-clockwise and both adjustment bolts in the second pair of adjustment bolts are turned counter-clockwise then the first clamp block would lower relative to the table parallel to the table.

19. An apparatus, comprising:
a table;
a first clamp block attached to the table;
a first end stop attached to the table and abutting a first end of the first clamp block;
a second end stop attached to the table and abutting a second end of the first clamp block, the second end opposite the first end;
the first clamp block comprising an upper level and a lower level;
a clamp attached to the upper level of the first clamp block;
a first adjustment mechanism on a first end portion of the first clamp block near the first end stop passing through both the upper level and the lower level, the first adjustment mechanism configured to adjust an angle of the upper level;
a second adjustment mechanism on a second end portion of the first clamp block near the second end stop passing through both the upper level and the lower level, the second adjustment mechanism configured to adjust an angle of the upper level;
a second clamp block attached to the table;
a third end stop attached to the table and abutting a third end of the second clamp block;
a fourth end stop attached to the table and abutting a fourth end of the second clamp block, the fourth end opposite the third end;
the second clamp block comprising a second upper level and a second lower level;
a second clamp attached to the second upper level of the second clamp block;
a third adjustment mechanism on a first end portion of the second clamp block near the third end stop passing through both the second upper level and the second lower level, the third adjustment mechanism configured to adjust an angle of the second upper level; and
a fourth adjustment mechanism on a second end portion of the second clamp block near the fourth end stop passing through both the second upper level and the second lower level, the fourth adjustment mechanism configured to adjust an angle of the second upper level.

20. The apparatus as recited in claim 19, wherein the table comprises a plurality of holes aligned with the first end stop, thereby allowing adjustment of a location of the first end stop.

* * * * *